No. 873,671. PATENTED DEC. 10, 1907.
G. LEWIS & D. A. SMITH.
PRESSURE TANK.
APPLICATION FILED AUG. 30, 1906.
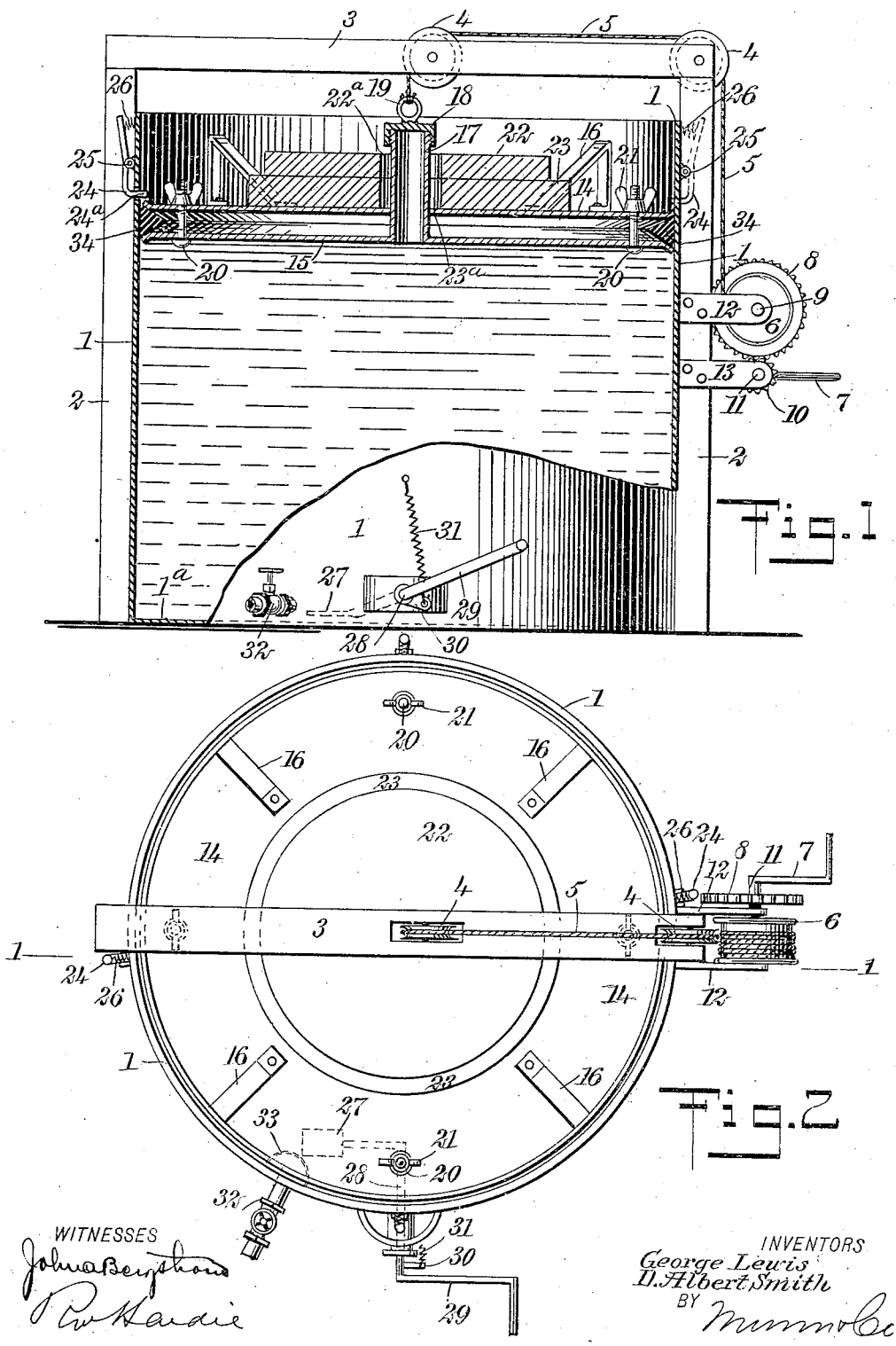

UNITED STATES PATENT OFFICE.

GEORGE LEWIS AND DAVID ALBERT SMITH, OF ALTO PASS, ILLINOIS.

PRESSURE-TANK.

No. 873,671.  Specification of Letters Patent.  Patented Dec. 10, 1907.

Application filed August 30, 1906. Serial No. 332,561.

*To all whom it may concern:*

Be it known that we, GEORGE LEWIS and DAVID ALBERT SMITH, both citizens of the United States, and residents of Alto Pass, in the county of Union and State of Illinois, have invented a new and Improved Pressure-Tank, of which the following is a full, clear, and exact description.

This invention relates to pressure tanks adapted to contain spraying mixtures, and to be mounted on carrying wheels or otherwise adapted to be transported from one place to another, and has for its object to provide a tank of that character with means adapted to exert the desired pressure on the mixture contained therein and to force it out of the tank under such pressure.

Our invention has for its object further to provide a device which shall be strong and simple in construction, light in weight, inexpensive to operate, of great durability and not liable to get out of order.

Such objects we accomplish by the means illustrated in the accompanying drawings, in which drawings like characters of reference indicate like parts throughout the views, and in which Figure 1 is a vertical central section taken on the line 1—1 of Fig. 2, showing the lower portion of a tank and connecting mechanism in side elevation; and Fig. 2 is a plan view of a tank embodying our invention.

As illustrated in the drawings, the tank is formed of a cylindrical body 1 having a bottom 1ª secured to the cylinder in any suitable manner. A follower preferably composed of two members 14 and 15 is arranged within the cylindrical portion of the tank and adapted to rest on the top of the liquid mixture contained in the tank. Pressure is applied to the follower so as to force the follower down on to the mixture, by means of weights 22 and 23 which are preferably constructed in the form of disks having central openings 22ª and 23ª respectively, so as to adapt such weights to be arranged on the central portion of the follower. A vertical tube 17 is secured to the lower member 15 of the follower and opens into the interior of the tank. This tube passes through the upper member 14 of the follower by means of an aperture made in said member and the upper end of the tube is provided with a screw cap 18. Upright standards 2 are arranged against the wall of the tank, and if desired secured thereto, and are connected together at their upper ends by a cross bar 3. Sheaves 4 are journaled on the cross bar 3, and a drum 6 is journaled to one of said uprights by means of brackets 12 which bear the ends of the shaft 9 upon which the drum 6 is mounted. A gear 8 is rigidly secured to the shaft 9, and said gear meshes with a pinion 10 which is secured to a shaft 11 journaled upon brackets 13 which are secured to one of the uprights 2. A crank 7 is attached to the shaft 11 which supports the pinion 10. A cable 5 is secured at one end to a ring 19 formed on the screw cap 18 or secured thereto, and passes over the sheaves 4 and around the drum 6 mounted upon the shaft 9. The lower end of the tank is provided with an outlet valve 32 to which a hose provided with a sprinkler or sprayer may be attached. The inner portion of the tank adjacent to the valve 32 may be provided with a strainer 33, and a plate 27 may be secured to an arm mounted upon a rock shaft 28. The rock shaft 28 passes through the lower portion of the tank, and is provided on its outer end with a crank lever 29. A short arm 30 is also secured to the shaft 28 and is connected with a spring 31. The lever 29 is adapted to be operated by the foot alternately with the action of the spring 31, so as to rock the arm 27 which serves to agitate the mixture in the vicinity of the strainer 33, and thereby keeps the mixture in motion so as not to allow any sediment to collect and clog the wire netting or screen 33 arranged around the pipe connections of the valve 32.

The follower is raised upward by means of the cable 5 operated by the drum 6 and the gear 8 connected therewith, which is controlled by the pinion 10 and the crank lever 7 secured to the journal 11 which supports said pinion. The follower may be held at any point of elevation within the tank by means of the ordinary pawl and ratchet which may be secured to the shaft 9 supporting the drum 10, or to the shaft 11 upon which the pinion 10 is mounted. The follower is moved downward by means of its own weight and the auxiliary weights 22 and 23, which may be made of different sizes so as to apply to the upper surface of the follower as much weight as may be desired, and thereby apply the desired amount of pressure on the liquid mixture in the tank so as to force said liquid out through the valve 32 under the desired pressure. The upper surface of the follower is provided with guide bars 16 having one end extending in line with the inner surface of the tank, and the remaining portion bent at an inclination to such end and secured to the upper surface of the follower. Such guide bars enable the follower to rise and fall without binding at its edge against the inner surface of the tank. The outer edge of the follower is provided with a packing 34, which is preferably clamped between the inclined outer edges of the members 14 and 15 composing the follower. Bolts 20 pass through such members and are provided with thumb nuts 21, by means of which pressure may be applied to such packing so as to force its outer portion against the inner surface of the tank and thereby make a liquid tight joint between such parts, even when the liquid in the tank is under pressure caused by the auxiliary weights placed upon the follower. When it is desired to raise the follower, the compression from the packing may be released so as not to bind against the inner surface of the tank closely, and thereby enable the follower to be readily raised by the cable 5 and connecting mechanism.

The spraying mixture is inserted in the tank while the follower is raised, by detaching the screw cap 18 from the outer end of the tube 17. After the tank has been filled with the desired quantity of material, the cap is again applied to the tube 17 with a gasket arranged between the cap and end of the tube so as to make a perfectly tight joint. Safety catches are secured to the outer portion of the tank and consist of levers 24 mounted upon pivots 25, and provided with a bent end 24ª extending through the cylindrical portion of the tank into the interior thereof, so as to project over the outer edges of the follower and prevent further upward movement thereof. These safety levers prevent the follower from being forced out of the tank when the tank is full of material, and is being driven over rough ground. The outer ends of the levers 24 bear against springs 26, which keep the bent ends of the lever normally within the interior of the tank. When it is desired to remove the follower from the tank, the outer ends of the levers 24 may be bent inward against the springs 26, thereby removing the bent ends 24ª of the levers from the interior of the tank.

Having thus described the invention, what we claim as new and desire to secure by Letters Patent is:

1. The combination with a tank, of a follower comprising two flat disks provided with beveled edges forming a joint annular groove on their peripheries, means attached to the outer portion of the disks adapted to adjust the peripheries of the disks relatively to each other, a ring of packing clamped between said edges, a tube secured to the inner member of the follower and extending through the outer member, a cap detachably secured to the outer end of said tube, auxiliary weights applied to the follower, guide bars attached to the follower in line with the inner edges of the tank, and means for raising the follower, substantially as shown and described.

2. The combination with a tank, of a follower comprising two flat disks provided with beveled edges and forming a joint annular groove on their peripheries, adjusting bolts attached to the outer portion of said disks, a ring of packing clamped between said edges, a tube secured to the inner member and extending through the outer member of the follower, catches pivoted to said tank adapted to extend within the tank to limit the outward movement of the follower, auxiliary weights applied to the follower, and means for raising the follower, substantially as shown and described.

3. The combination with a tank, of a follower comprising two flat disks provided with beveled edges forming a joint annular groove on their peripheries, adjusting bolts attached to the outer portion of said disks, a ring of packing clamped between said edges, a tube secured to the inner member of the follower extending through the outer member, a cap detachably secured to the outer end of said tube, auxiliary weights applied to the follower, and means for raising the follower, substantially as shown and described.

4. The combination with a tank, of a follower comprising two flat disks provided with beveled edges forming a joint annular groove on their peripheries, adjusting bolts attached to the outer portion of said disks, a ring of packing clamped between said edges, weights applied to the follower, a discharge valve having a pipe connection with said tank, a strainer secured to the lower portion of said tank, adjacent to said pipe section, and a spring-actuated stirrer attached to the side of said tank in close proximity to said strainer, substantially as shown and described.

In testimony whereof we have signed our names to this specification in the presence of two subscribing witnesses.

GEORGE LEWIS.
D. ALBERT SMITH.

Witnesses:
C. M. ASBURY,
W. A. FRIESE.